United States Patent
Mangal et al.

(10) Patent No.: US 7,769,389 B1
(45) Date of Patent: Aug. 3, 2010

(54) METHOD AND SYSTEM FOR PREDICTIVE RESOURCE MANAGEMENT IN A WIRELESS NETWORK

(75) Inventors: Manish Mangal, Overland Park, KS (US); Kevin R. O'Connor, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1332 days.

(21) Appl. No.: 10/688,157

(22) Filed: Oct. 17, 2003

(51) Int. Cl.
*H04W 72/00* (2009.01)

(52) U.S. Cl. .................................. 455/452.1; 370/437

(58) Field of Classification Search ................ 455/450, 455/452.1, 452.2, 453, 509, 517, 464; 370/252, 370/477, 475, 329, 330, 341, 431, 437, 468
See application file for complete search history.

(56) References Cited

U.S. PATENT DOCUMENTS

| | | | |
|---|---|---|---|
| 5,428,817 A * | 6/1995 | Yahagi | 455/446 |
| 6,016,311 A * | 1/2000 | Gilbert et al. | 370/280 |
| 6,023,622 A * | 2/2000 | Plaschke et al. | 455/452.2 |
| 6,138,025 A | 10/2000 | Lee et al. | |
| 6,381,250 B1 * | 4/2002 | Jacobson et al. | 370/468 |
| 6,526,281 B1 * | 2/2003 | Gorsuch et al. | 455/452.1 |
| 6,724,740 B1 * | 4/2004 | Choi et al. | 370/335 |
| 6,819,660 B2 * | 11/2004 | Khare et al. | 370/342 |
| 6,850,764 B1 * | 2/2005 | Patel | 455/450 |
| 6,876,857 B1 * | 4/2005 | Nee et al. | 455/450 |
| 7,002,918 B1 * | 2/2006 | Prieto et al. | 370/252 |
| 7,219,132 B2 * | 5/2007 | Hreha et al. | 709/217 |
| 2002/0080816 A1 * | 6/2002 | Spinar et al. | 370/449 |
| 2002/0114334 A1 * | 8/2002 | Yang | 370/395.1 |
| 2002/0147022 A1 * | 10/2002 | Subramanian et al. | 455/453 |
| 2004/0002339 A1 * | 1/2004 | O'Connor | 455/450 |
| 2004/0264500 A1 * | 12/2004 | Bansal et al. | 370/468 |
| 2005/0180350 A1 * | 8/2005 | Kolor et al. | 370/320 |

* cited by examiner

*Primary Examiner*—Temica Beamer
*Assistant Examiner*—Anthony S Addy

(57) ABSTRACT

An access point for a wireless network, such as a base transceiver station, might use a variety of different methods to allocate its resources among mobile stations. For example, the access point might vary the way it allocates available bandwidth among the mobile stations, thereby also altering the data rates between the access point and the mobile stations. Various criteria, such as the number of the number of mobile stations actively communicating with the access point, might be used to trigger the access point to change how it allocates bandwidth among the active mobile stations.

20 Claims, 4 Drawing Sheets

METHOD AND SYSTEM FOR PREDICTIVE RESOURCE MANAGEMENT IN A WIRELESS NETWORK

FIELD OF THE INVENTION

This invention relates to wireless networks. More particularly, it relates to allocation of resources among mobile stations in a wireless network.

BACKGROUND OF THE INVENTION

An access point in a wireless network, such as a base transceiver station, may actively serve one or more mobile stations. The access point might have a predetermined amount of resources available to use when actively serving the mobile stations. For example, the access point might have a set amount of bandwidth it can allocate among the different mobile stations it actively serves. The amount of available bandwidth allocated to a particular mobile station can affect the data rate between the access point and that mobile station, with a greater bandwidth allocation generally resulting in a higher data rate between the base transceiver station and the mobile station.

The access point might use a particular method for allocating resources among the mobile stations it actively serves. While this method might be preferable for some network operating conditions, changes in the network operating conditions might make this method less than optimal. This might then adversely affect the respective data rates between the access point and mobile stations, or it might adversely affect the number of mobile stations that can be actively served by the access point. Other adverse affects might also occur.

Therefore, there exists a need for an improved system and method for resource management in a wireless network.

SUMMARY OF THE INVENTION

An access point for a wireless network, such as a base transceiver station, might dynamically change the method it uses to allocate resources among active mobile stations. For example, the access point might change the algorithm it uses to allocate available bandwidth among active mobile stations, which may in turn change the respective data rates between the access point and the mobile stations.

The access point might use a variety of different criteria to determine when to change the algorithm it uses to allocate bandwidth among active mobile stations. In one embodiment, the access point might track the number of active mobile stations it serves. If the number of mobile stations exceeds a threshold, the access point might use one algorithm to allocate bandwidth. Otherwise the access point might use a different algorithm to allocate bandwidth.

In another embodiment, the access point might use a predictive model based on the time of day to estimate the number of active mobile stations. The access point might then use the output of the predictive model to determine whether to change the algorithm it uses to allocate bandwidth among active mobile stations. In yet another embodiment, the access point might be programmed to change the algorithm it uses to allocate bandwidth at arbitrary times of day, and therefore it would not necessarily need to use the predictive model nor would it need to monitor the number of active mobile stations in order to trigger a change in the bandwidth allocation algorithm.

These as well as other aspects and advantages of the present invention will become apparent from reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

1. Exemplary Architecture

Figure 1:
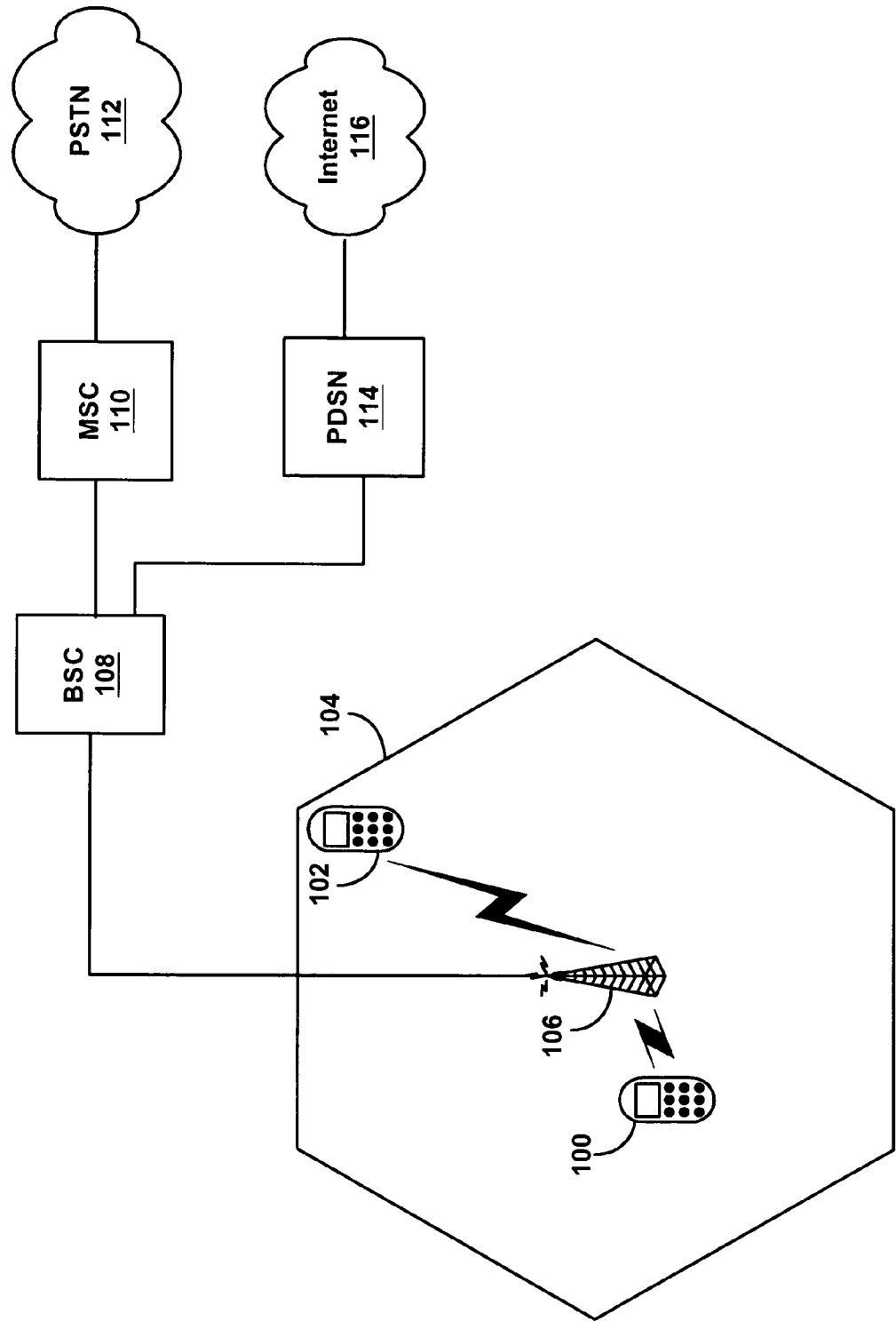
FIG. 1 shows an exemplary architecture for a wireless network, such as can be used to dynamically change algorithms used to allocate radio frequency resources among mobile stations.

FIG. 1 shows an exemplary architecture for a wireless network, such as can be used to dynamically change algorithms used to allocate radio frequency resources among mobile stations. As depicted in FIG. 1, a first mobile station 100 and a second 102 mobile station are located within a sector 104 of the wireless network. The mobile stations 100, 102 may be any type of wireless device, such as a mobile phone, a personal digital assistant ("PDA"), a two-way pager, a two-way radio, a wirelessly equipped computer or another wireless device. While FIG. 1 depicts two mobile stations 100, 102 within the sector 104, the sector 104 may include a greater or fewer number of mobile stations, and it is not necessary that the mobile stations all be the same type of wireless device.

A wireless network may include many different coverage areas, such as different sectors. Each coverage area of a wireless network may include one or more different access points with which mobile stations in the coverage area can communicate via an air interface. Each access point might serve a sector of the wireless network, or alternatively a sector might be served by multiple access points. The access points may provide the mobile stations with connectivity to the wireless network, which the mobile station can use to obtain voice and/or data services. The particular services provide by a wireless network as well as the particular breakdown of the wireless network into coverage areas may vary depending on the type and implementation of the wireless network.

As depicted in FIG. 1, the mobile stations 100, 102 communicate with a base transceiver station ("BTS") 106 through an air interface. The mobile stations 100, 102 can communicate with the BTS 106 via the air interface using a variety of different protocols. In one exemplary embodiment, the mobile stations 100, 102 communicate with the BTS 106 using Code Division Multiple Access ("CDMA"), such as in a CDMA2000 3G packet data network. CDMA provides a method for sending wireless signals between the mobile stations 100, 102 and the BTS 106. In a CDMA system, the mobile stations 100, 102 communicate with the BTS 106 over a spread spectrum of frequencies.

CDMA is described in further detail in Telecommunications Industry Association ("TIA") standards IS-95A and IS-95B, which are both incorporated herein by reference in their entirety. CDMA is also described in the International Telecommunications Union ("ITU") IMT-2000 series of standards, which are all incorporated herein by reference in their entirety. CDMA is further described in the TIA IS-2000 series of standards, which are all incorporated herein by reference in their entirety. The IS-2000 series of standards are commonly referred to as CDMA2000.

Other protocols may also be used for communication between the mobile stations 100, 102 and the BTS 106. For example, the mobile stations 100, 102 and the BTS 106 might communicate using Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Global System for Mobile Communication ("GSM"), General Packet Radio Services ("GPRS"), IS-136, Time Division Multiple Access ("TDMA"), Frequency Division Multiple Access ("FDMA") or other protocols. Additional wireless protocols, such Institute of Electrical and Electronics Engineers ("IEEE") 802.11, Bluetooth and others may also be used.

The BTS 106 couples to a base station controller ("BSC") 108, which can perform various functions such as managing handoffs of the mobile stations 100, 102 as they move among different sectors, each of which may be served by a different BTS. The BSC 108 may in turn connect to a mobile switching center ("MSC") 110. The MSC 110 can manage setup and teardown of connections with the mobile stations 100, 102. While the BSC 108 and the MSC 110 are depicted as separate components, it is possible that their functionality may be combined into a single component.

The MSC 110 can additionally provide connectivity to the public switched telephone network ("PSTN") 112. Using this connectivity, the mobile stations 100, 102 might communicate with other devices that are also connected to the PSTN 112. For example, the mobile stations 100, 102 might form circuit switched connections with other devices on the PSTN 112 and then exchange voice and/or data traffic over those circuit switched connections.

In addition to connecting to the MSC 110, the BSC 108 might also connect with a packet data serving node ("PDSN") 114. The PDSN 114 may in turn provide connectivity to a packet data network, such as the Internet 116, an intranet or another packet data network. The mobile stations 100, 102 can use the connectivity to communicate with devices on the other packet data networks.

When connecting to the wireless network for data services, the mobile stations 100, 102 might establish a Point-to-Point Protocol ("PPP") session with the PDSN 114. As is known in the art, PPP is a data link protocol for communication between two devices. Once connected to the PDSN 114, for example through a PPP session, the mobile stations 100, 102 can access the Internet 116 or another packet data network. While the mobile stations 100, 102 may communicate with the PDSN 114 through a PPP session, they may communicate with other devices using higher-level protocols. For example, the mobile stations 100, 102 may additionally use the Transmission Control Protocol ("TCP"), the User Datagram Protocol ("UDP") or other protocols.

PPP is described in more detail in Internet Engineering Task Force ("IETF") Request for Comments ("RFCs") 1661, 1662 and 1663, all of which are incorporated herein by reference in their entirety. IP is described in more detail in IETF RFC 791, which is incorporated herein by reference in its entirety. TCP is described in more detail in IETF RFC 793, which is incorporated herein by reference in its entirety. UPD is described in further detail in IETF RFC 768, which is incorporated herein by reference in its entirety. More information on these and other IETF standards may be found at the URL "www.ietf.org."

2. Exemplary Channel Allocation in a CDMA Network

Multiple mobile stations may be within a coverage area of a wireless network. For example, FIG. 1 illustrates two mobile stations 100, 102 within the sector 104. All the mobile stations within the sector 104, however, might not be actively accessing the wireless network for voice and/or data services. For example, the mobile stations 100, 102 might not be involved in an active voice call or might not have an established data connection with the wireless network. The mobile stations 100, 102, however, might still communicate with the BTS 106 in order to register their presence within the sector 104. This can allow the BTS 106 to direct voice calls or other traffic to the mobile stations 100, 102 as well as to allow the mobile stations 100, 102 to initiate a voice call or data services on the wireless network.

When a mobile station becomes involved in an active connection with the wireless network, the BTS 106 may assign the mobile station one or more traffic channels that can be used to send voice or data traffic between the mobile station and the BTS 106. Other channels might be used to send control and signaling information to the mobile stations 100, 102. Traffic from the BTS 106 to the mobile stations 100, 102 is generally termed traffic in the forward direction, while traffic from the mobile stations 100, 102 to the BTS 106 is generally termed traffic in the reverse direction. These directional labels are merely arbitrary, and other points of reference and other labels might also be used.

Ordinarily a CDMA network uses one frequency range for transmission in the forward direction and a second frequency range for transmissions in the reverse direction. Thus, the BTS 106 may use one set of frequencies to transmit signals in the forward direction to a particular mobile station, while the same mobile station might use another set of frequencies to transmit signals in the reverse direction to the BTS 106. Other CDMA implementations or other wireless networks might alternatively use the same frequencies for forward and reverse transmissions. Other variations are also possible. The BTS 106 may use a variety of forward channels to send control and signaling information to the mobile stations 100, 102. A pilot channel can be used to transmit a pilot signal to the mobile stations 100, 102. The pilot signal can be used for initial sector synchronization, for a reference to demodulate received signals and for other functions. A sync channel can be used to transmit synchronization messages to the mobile stations 100, 102, which the mobile stations 100, 102 can use to acquire frame synchronization after sector acquisition. A paging channel can be used to transmit paging and overhead messages to the mobile stations 100, 102. A broadcast common channel can be used to send broadcast messages to the mobile stations 100, 102, and a common control channel can be used to send various control messages to the mobile stations 100, 102.

The mobile stations 100, 102 may similarly use a variety of different reverse channels to send control and signaling information to the BTS 106. The reverse channels may include access channels, control channels or other channels. It should be understood that these various forward and reverse channels are merely exemplary in nature. The particular forward and reverse channels might depend on the particular CDMA implementation. Further, other non-CDMA wireless networks might use a greater or fewer number of forward or reverse channels, which may be different than the ones previously described.

In addition to the previously described channels, which are used primarily for exchanging control and signaling information, the BTS 106 may assign one or more channels to the mobile stations 100, 102 that are used primarily for the voice and/or data traffic between the BTS 106 and the mobile stations 100, 102. For example, when the BTS 106 actively serves a mobile station, the BTS 106 might assign the mobile station a forward fundamental channel. The forward fundamental channel can be used to send voice and/or data traffic from the BTS 106 to the mobile station. Depending on the particular CDMA implementation, the forward fundamental channel ordinarily has a maximum data rate of 9.6 kb/s or 14.4 kb/s; however, varying network conditions might cause the forward fundamental channel have an actual data rate that is less than this maximum data rate. These maximum data rates are merely exemplary in nature, and other wireless network might support different maximum data rates.

The BTS 106 may additionally have one or more forward supplemental channels, which can also be used to transmit voice and/or data traffic from the BTS 106 to the mobile stations 100, 102. The forward supplemental channels ordinarily have a maximum data rate of 153.6 kb/s or 307 kb/s. Depending on network conditions, however, the actual data rate on the forward supplemental channels might be less than these maximum data rates. These maximum data rates are merely exemplary and might also vary depending on the particular wireless network. The BTS 106 can allocate the available bandwidth of its forward supplemental channels among the mobile stations it serves, thereby controlling what portion of the available data rate is allocated to a particular mobile station.

The BTS 106 may vary the power level it uses to communicate with the mobile stations 100, 102 in the sector 104. Generally, the BTS 106 limits the strength of signals to the mobile stations to the lowest level that still allows the mobile station to accurately recover the transmitted signal and to achieve the desired data rate. That is, the strength of the signal received by the mobile station would be sufficiently strong so that the mobile station can differentiate the signal transmitted by the BTS 106 from noise or other interference; however, the strength of the signal would generally not be much above this level. Limiting the power level in this manner helps reduce interference with other signals and also reduces the overall power used by the BTS 106. The mobile stations 100, 102 can use a similar power control methods to limit the strength of signals they transmit to the BTS 106.

Various factors may then affect what power level the BTS 106 uses to transmit signals to a particular mobile station. For example, the closer a mobile station is to the BTS 106, the lower the power level the BTS 106 generally needs to use when transmitting signals to that mobile station. As the mobile station moves farther away from the BTS 106, the BTS 106 would generally need to increase the power level of the signals it transmits to the mobile station in order to account for signal propagation losses, obstructions between the BTS 106 and the mobile station, atmospheric conditions and other factors that degrade the transmitted signals.

The power level used by the BTS 106 can affect the data rate between the BTS 106 and the mobile station. For example, the BTS 106 might use a particular modulation scheme for the data it sends to a mobile station. One such modulation scheme is quadrature phase-shift keying ("QPSK"). Other modulations schemes, such as 8-PSK, 16-PSK and others, might also be used. These modulation schemes generally support different data rates. For example, 8-PSK ordinarily supports a higher data rate than QPSK, while 16-PSK ordinarily supports a higher data rate than 8-PSK.

The modulation schemes that support higher data rates, however, typically require a higher signal-to-noise ratio ("SNR") than modulation schemes that support lower data rates. Thus, the SNR between the BTS 106 and a mobile station required to use 8-PSK would ordinarily be higher than the SNR required to use QPSK. Similarly, the SNR required to use 16-PSK would ordinarily be higher than the SNR required to use 8-PSK.

The SNR is generally directly dependent on the power level used by the BTS 106 when transmitting signals to a mobile station. Thus, the greater the power level used by the BTS 106 when transmitting signals to the mobile station, the greater the SNR of the signals received by the mobile station. Conversely, as the BTS 106 decreases the power level used to transmit signals to the mobile station, the SNR of the signals received by the mobile station would also decrease. The BTS 106 and the mobile station typically negotiate to select the modulation scheme that has the higher data rate supportable based on the SNR between the BTS 106 and the mobile station. By changing the power level, the BTS 106 can cause a renegotiation of the modulation scheme that in turn might affect the data rate between the BTS 106 and the mobile station.

3. Dynamic Allocation of Resources Assigned to Mobile Stations

While a particular method for allocating bandwidth might be preferred under some wireless network operating conditions, the same methods might not be preferable for other wireless network operating conditions. For example, during peak usage times it might be preferable to use a method that equalizes the data rates between mobile stations so that one particular mobile station does not receive a higher data rate at the expense of many other mobile stations that are trying to access the wireless network.

However, during other times when the wireless network has plenty of available bandwidth to distribute among a smaller number of active mobile stations, this method might not be preferable. For example, a mobile station that is farther away from the access point and therefore cannot achieve a relatively higher data rate no matter how much bandwidth it is allocated might unnecessarily limit the data rate for a mobile station that is closer to the access point and could otherwise be allocated enough bandwidth to receive traffic from the access point at a relatively higher data rate. These are merely examples, and many other operating conditions might affect the optimality of a particular algorithm for allocating bandwidth.

As these operating conditions change, a method that was preferred for one set of operating conditions might not be the preferred algorithm to use for the new operating conditions. This might have adverse affect on the wireless network, such as limiting the number of mobile stations that can be served by the access point, limiting the data rates achievable by the mobile stations served by the access point or other such adverse affects. Therefore, it might be advantageous for the BTS 106 to dynamically alter the method by which it allocates resources, such as available bandwidth, among the mobile stations 100, 102 in the sector 104.

In one embodiment, the BTS 106 may dynamically change the method it uses to allocate the available bandwidth on forward supplemental channels or other channels among the mobile stations 100, 102 within the sector 104. This may then alter the respective data rates between the BTS 106 and the mobile stations 100, 102. The BTS 106 might use a variety of different factors, such as the number of active mobile stations within the sector 104, to determine when to change the method it uses to allocate available bandwidth among the mobile stations 100, 102. However, other factors might also be used.

The BTS 106 may include logic, such as algorithms that are stored in data storage and executable on a processor, to control how the BTS 106 allocates its available bandwidth among the mobile stations 100, 102 in the sector 104. In response to one or more various conditions, the BTS 106 can switch from using one algorithm to allocate bandwidth to using a different algorithm to allocate bandwidth, and the various algorithms might each implement different methods for allocating bandwidth among the mobile stations 100, 102.

It should be understood that while the discussion herein refers to the BTS 106 controlling how bandwidth is allocated among the mobile stations 100, 102 in the sector 104, another element in the wireless network might alternatively control how bandwidth is allocated among the mobile stations 100, 102. Alternatively, multiple elements in the wireless network might operate together to control the bandwidth allocation among the mobile stations 100, 102. Other variations are also possible.

The BTS 106 might use many different methods to allocate bandwidth among the mobile stations 100, 102 in the sector 104, and these methods might attempt to optimize the allocation according to different criteria. For example, the BTS 106 might execute a scheduler program that can switch between algorithms that determine how to allocate bandwidth among mobile stations according to different criteria. In one method, the available bandwidth may be allocated among the mobile stations 100, 102 so as to maximize the aggregate traffic sent to mobile stations 100, 102. That is, the bandwidth might be allocated so that the sum of the resulting respective data rates between the BTS 106 and the mobile stations 100, 102 is at a maximum.

The BTS 106 might execute a maximum-aggregate-traffic algorithm to determine how to allocate the bandwidth among the mobile stations 100, 102 so as to maximize the aggregate traffic sent from the BTS 106 to the mobile stations 100, 102 within the sector 104. The particular allocation of bandwidth among the mobile station 100, 102 that maximizes the aggregate traffic might depend on various factors, such as the number of mobile stations being actively served by the BTS 106, the location of the mobile stations 100, 102 within the sector 104, and conditions that affect the SNR of signals between the BTS 106 and the mobile stations 100, 102 (e.g., signal propagation losses, atmospheric conditions, obstructions between the BTS 106 and the mobile stations 100, 102 and others).

It should be understood, however, that while the discussion herein describes maximizing the aggregate traffic sent from the BTS 106 to the mobile stations 100, 102, in practice the aggregate traffic might not be the theoretical maximum aggregate traffic rate. That is, the maximum-aggregate-traffic algorithm might substantially maximize the aggregate traffic sent to the mobile stations 100, 102 when compared to other algorithms or when compared to the theoretical maximum aggregate traffic rate, but it might not actually achieve the theoretical maximum aggregate traffic rate.

In another method, the available bandwidth may be allocated among the mobile stations 100, 102 in the sector 104 so as to provide each mobile station with approximately the same data rate. That is, the bandwidth might be allocated so that the respective data rates between the BTS 106 and the mobile stations 100, 102 are approximately equal. The BTS 106 might execute a common-data-throughput algorithm in order to determine how to allocate the bandwidth so that the BTS 106 communicates with each mobile station 100, 102 at approximately the same data rate. Although the BTS 106 might allocate approximately the same bandwidth to each mobile station, this would not necessarily mean that the BTS 106 uses the same power to transmit signals to each mobile station.

In yet another method, the available bandwidth may be allocated among the mobile stations 100, 102 in the sector 104 by using approximately the same power to transmit signals from the BTS 106 to the mobile stations 100, 102. The BTS 106 might execute a common-power algorithm in order to achieve this bandwidth allocation. Although the BTS 106 might use approximately the same power to transmit traffic to the mobile stations 100, 102, this would not necessarily mean that the respective data rates between the BTS 106 and the mobile stations 100, 102 would be the same.

As previously described, these various bandwidth allocation algorithms might result in different data rates between the BTS 106 and the mobile stations 100, 102. In one example of how these algorithms might affect the respective data rates between the BTS 106 and the mobile stations 100, 102, the BTS 106 might be actively serving both mobile stations 100, 102, and the first mobile station 100 might be closer to the BTS 106 than the second mobile station 102.

Applying the maximum-aggregate-traffic algorithm to this scenario results in a bandwidth allocation that substantially maximizes the data rates of the mobile stations 100, 102. For example, the algorithm might determine that the maximum aggregate data rate occurs when the bandwidth is allocated so that the BTS 106 achieves a data rate of 150 kbs with the first mobile station 100 and a data rate of 50 kbs with the second mobile station 102. As illustrated in this example, the maximum aggregate traffic generally occurs when the mobile station closest to the BTS 106 (e.g., the first mobile station 100) is allocated enough bandwidth to achieve its highest possible data rate, while the mobile station that is farther away from the BTS 106 (e.g., the second mobile station 102) then gets the remaining bandwidth.

Applying the common-data-throughput algorithm to this scenario results in bandwidth allocation that approximately equalizes the respective data rates between the BTS 106 and the mobile stations 100, 102. For example, the algorithm might determine that this occurs when the bandwidth is allocated so that the BTS 106 has a data rate of 80 kbs with the first mobile station 100 and a data rate of 75 kbs with the second mobile station 102. As illustrated in this example, the respective data rates might be approximately equal but do not necessarily have to be exactly equal. Also, this example illustrates that the combined data rates of the mobile stations 100, 102 when using this algorithm (e.g., 75 kbp+80 kbs=155 kbs) are less than the combined data rates of the mobile stations 100, 102 when using the maximum-aggregate-traffic algorithm (e.g., 150 kbs+50 kbs=200 kbs).

This example further illustrates how mobile stations that are farther away from the BTS 106 might limit the data rate achieved using the common-data-throughput algorithm. Mobile stations that are farther away from the BTS 106 (e.g., the first mobile station 100 in this example) generally experience greater signal loss and therefore have a lower SNR than mobile stations that are closer to the BTS 106 (e.g., the second mobile station 102 in this example). Thus, the BTS 106 generally would be able to achieve a higher data rate with the closer mobile stations. As this algorithm equalizes the data rates among the mobile stations 100, 102, those mobile stations that are farther away from the BTS 106 will generally limit the data rate of all the mobile stations when this algorithm is used.

Applying the common-power algorithm to this scenario causes the BTS 106 to use generally the same power level for transmitting signals to the mobile stations 100, 102; however, this might nevertheless result in data rates that are unequal between the mobile stations 100, 102. For the same power, mobile stations that are closer to the BTS 106 might be able to achieve a higher data rate. For example, using this algorithm the BTS 106 might have a data rate of 120 kbs with the first mobile station 100 and a data rate of 60 kbs with the second mobile station 102. This example again illustrates how the combined data rates (e.g., 150 kbs+50 kbs=200 kbs) for the maximum-aggregate-traffic algorithm are greater than the combined data rates (e.g., 120 kbs+60 kbs=180 kbs) for this algorithm.

The BTS 106 might dynamically alter the method it uses to allocate bandwidth among the mobile stations 100, 102 in the sector 104. That is, the BTS 106 might dynamically change among different algorithms used to allocated bandwidth. The BTS 106 might change the particular algorithm it uses based on various factors, for example, the number of active mobile stations in the sector 104. In one embodiment, the BTS 106 might use one method for allocating bandwidth if the number of mobile stations in the sector 104 is above a threshold and a second method for allocation bandwidth if the number of active mobile stations is not above the threshold. In another embodiment, the BTS 106 might use more than one threshold.

In yet another embodiment, the BTS 106 might divide the mobile stations 100, 102 in to one or more groups of mobile stations. The BTS 106 might use different methods for allocating bandwidth among mobile stations in the different groups, thereby potentially allowing the BTS 106 to provide different levels of service to different groups of mobile stations. For example, the BTS 106 might use a first method to allocate bandwidth among mobile stations in a first group of mobile stations, and the BTS 106 might use a second method to allocate bandwidth among mobile stations in second group of mobile stations. Each group might have its own predefined threshold, which the BTS 106 can use as a trigger to dynamically change the bandwidth allocation algorithm used for that group.

The BTS 106 may determine the number of active mobile stations in the sector 104 in a variety of different manners. For example, the BTS 106 typically tracks the number of active mobile stations in the sector 104, and it can then use that number of active mobile stations to determine whether a particular threshold has been met. Alternatively, another element in the wireless network might track the number of active mobile stations in the sector 104. The other element may in turn provide that information to the BTS 106, which the BTS 106 can then use to determine if the threshold has been met. Still alternatively, another element may determine that the threshold has been met and then notify the BTS 106, which can in turn dynamically switch the algorithm it uses to allocate bandwidth.

In another embodiment, the BTS 106 might use a predictive method for determining the number of active mobile stations in the sector 104. For example, the number of active mobile station within the sector 104 may vary throughout the day. However, certain times might consistently experience a higher or lower number of active mobile stations within the sector 104 than other times. Accordingly, a predictive model might be derived from historical data, and the predictive model may then be used to predict current or future numbers of active mobile stations in the sector 104 in order to determine when a threshold has been met such that the BTS 106 then switches between bandwidth allocation algorithms.

In one embodiment, the BTS 106 itself might store the predictive model. In an alternate embodiment, some other element on the wireless network might store the predictive model and provide results from the predictive model to the BTS 106. In another alternate embodiment, the predictive model may be used to determine the number of active mobile stations within the sector 104 based on the time of day, and then the BTS 106 might be programmed to change its bandwidth allocation methods at certain times of day. In this embodiment the BTS 106 would not then need to rely on the predictive algorithm once it had been programmed. In yet another alternate embodiment, the BTS 106 might simply be programmed to change the algorithm it uses at arbitrary times of day without using a predictive algorithm to set those particular times. Other criteria might also be used to determine when the BTS 106 switches among bandwidth allocation algorithms.

Figure 2:
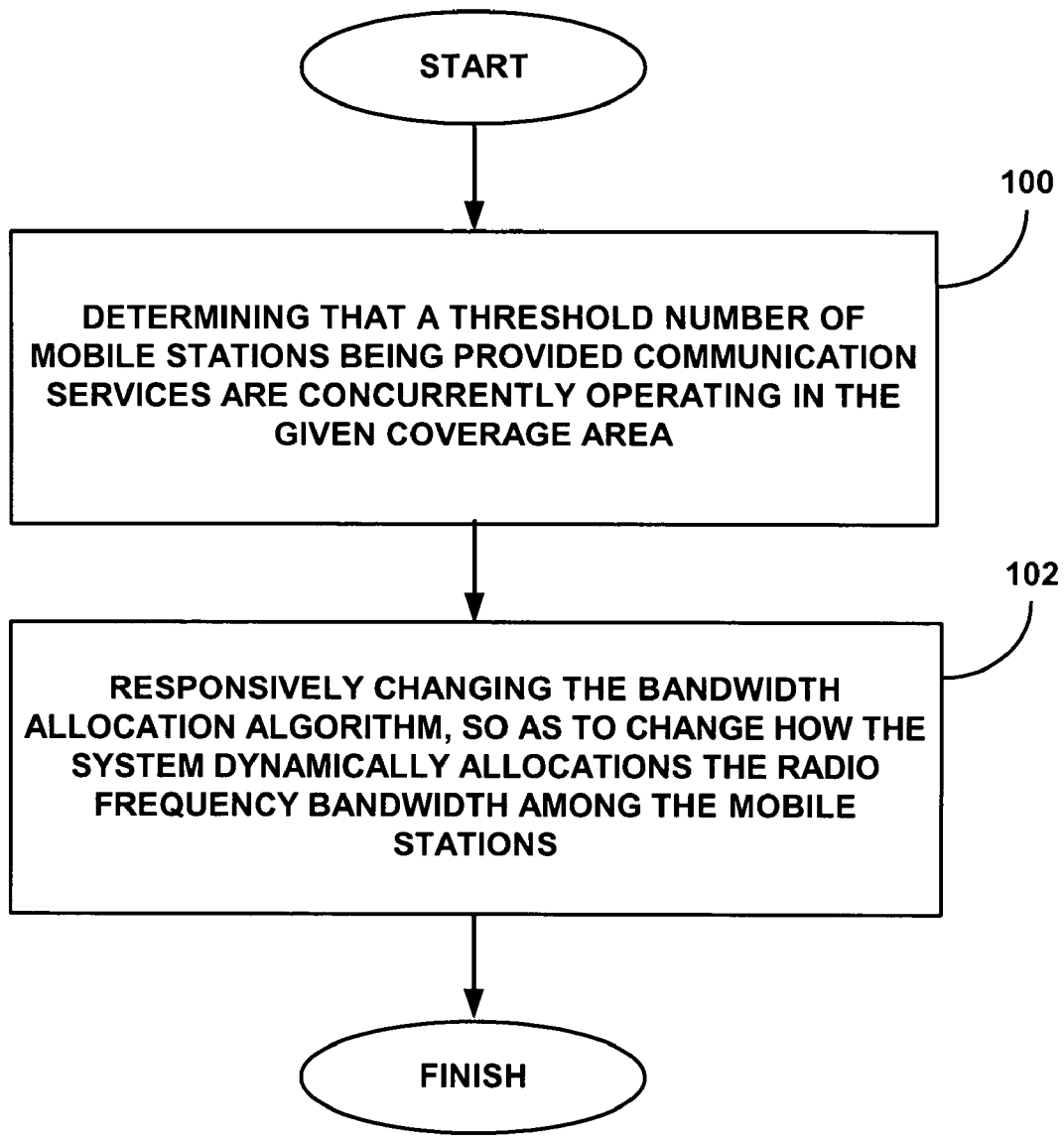
FIG. 2 is a flowchart of an exemplary process that can be used to dynamically alter the bandwidth allocation algorithm used in a wireless communication system based on the number of active mobile stations in a given coverage area.

FIG. 2 is a flowchart of an exemplary process that can be used to dynamically alter the bandwidth allocation algorithm used in a wireless communication system based on the number of active mobile stations in a given coverage area. The wireless communication system may be adapted to provide communication services to multiple mobile stations operating within a given coverage area. The system can dynamically allocate radio frequency bandwidth among the mobile stations according to a bandwidth allocation algorithm, and the radio frequency bandwidth can be used to send voice or data traffic to the mobile stations as part of providing the communication services. An element, such as a base station, determines that a threshold number of mobile stations being provided communications services are concurrently operating in the given coverage area, as shown at Step 100. Then, the element responsively changes the bandwidth allocation algorithm so as to change how the system dynamically allocates the radio frequency bandwidth among the mobile stations, as shown at Step 102.

In one method for determining that the threshold number of mobile stations being provided communication services are concurrently operating in the given coverage area, such as is performed at Step 102, the element might first determine a current time of day and then use a predictive model estimate the number of mobile stations operating in the given coverage area at that time of day. Other methods of making this determination are also possible.

Figure 3:
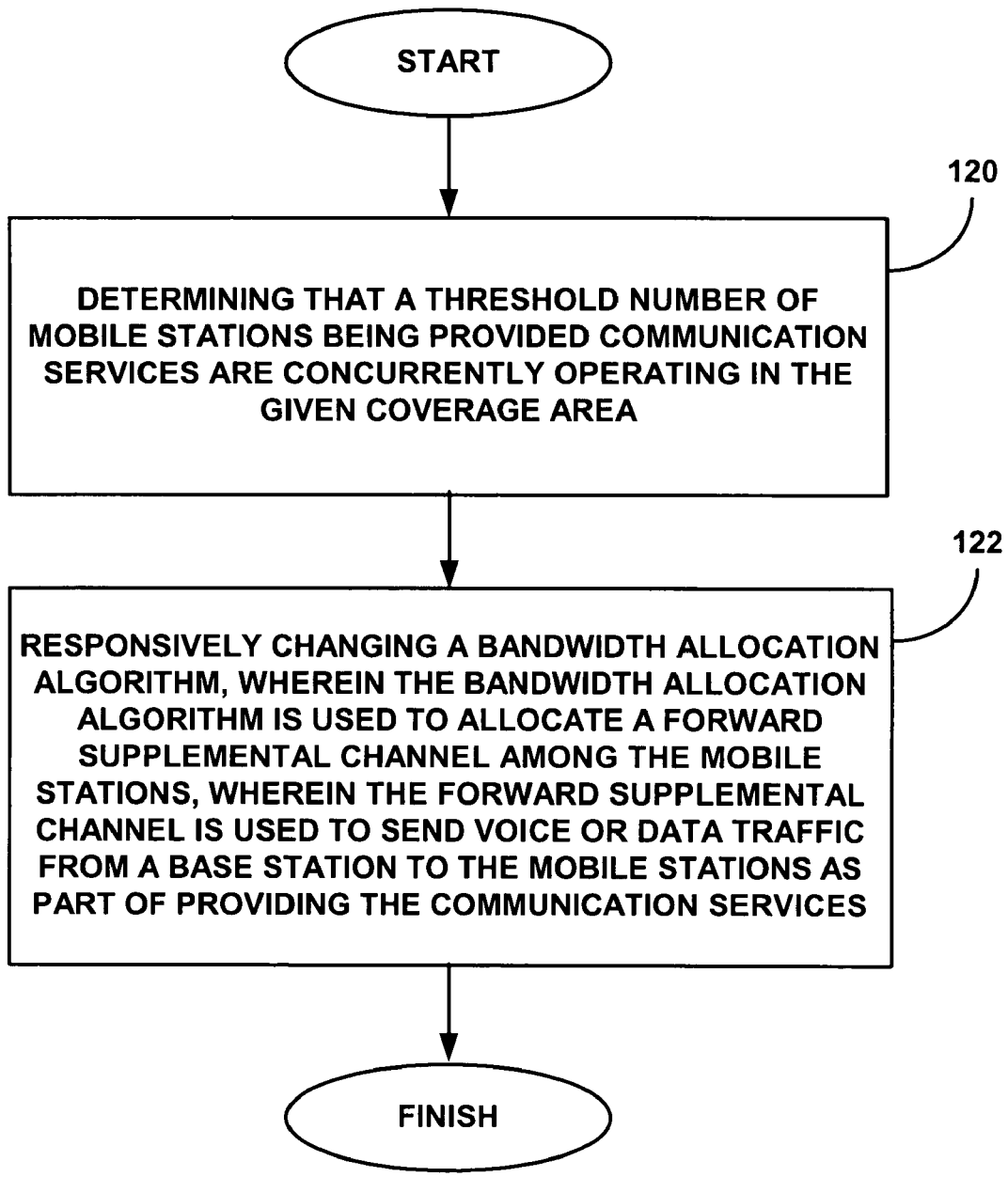
FIG. 3 is a flowchart of an exemplary process that can be used to dynamically alter a bandwidth allocation method used in a CDMA network based on the number of active mobile stations in a given coverage area.

FIG. 3 is a flowchart of an exemplary process that can be used to dynamically alter a bandwidth allocation method used in a CDMA network based on the number of active mobile stations in a given coverage area. The CDMA network can be adapted to provide communication services concurrently to multiple mobile stations operating within a given coverage area. A base station, or potentially some other element, determines that a threshold number of mobile stations being provided communication service are concurrently operating in the given coverage area, as shown at Step 120. Then, the base station responsively changes a bandwidth allocation algorithm that is used to allocate a forward supplemental channel among the mobile stations, where the forward supplemental channel is used to send data traffic from the base station to the mobile stations as part of providing the communication services, as shown at Step 122.

In yet another embodiment, the BTS 106 might be programmed to change its bandwidth allocation method based on factors other than the number of active mobile stations within the sector 104. These other factors might be in addition to the number of mobile stations in the sector 104 or in place of the number of mobile stations within the sector 104. Many other variations are also possible. For example, the BTS 106 might monitor the amount of voice or data traffic buffered at the BTS 106 for transmission to the mobile stations. In one embodiment, if the amount of voice or data traffic buffered at the BTS 106 for transmission to a particular mobile station exceeds a predetermined threshold, the BTS 106 might increase the bandwidth allocated to that mobile station. In another embodiment, if the amount of voice or data traffic buffered at the BTS 106 for transmission to a particular group of mobile stations exceeds a predetermined threshold, the BTS 106 might then increase the bandwidth allocated to that group of mobile stations.

Figure 4:
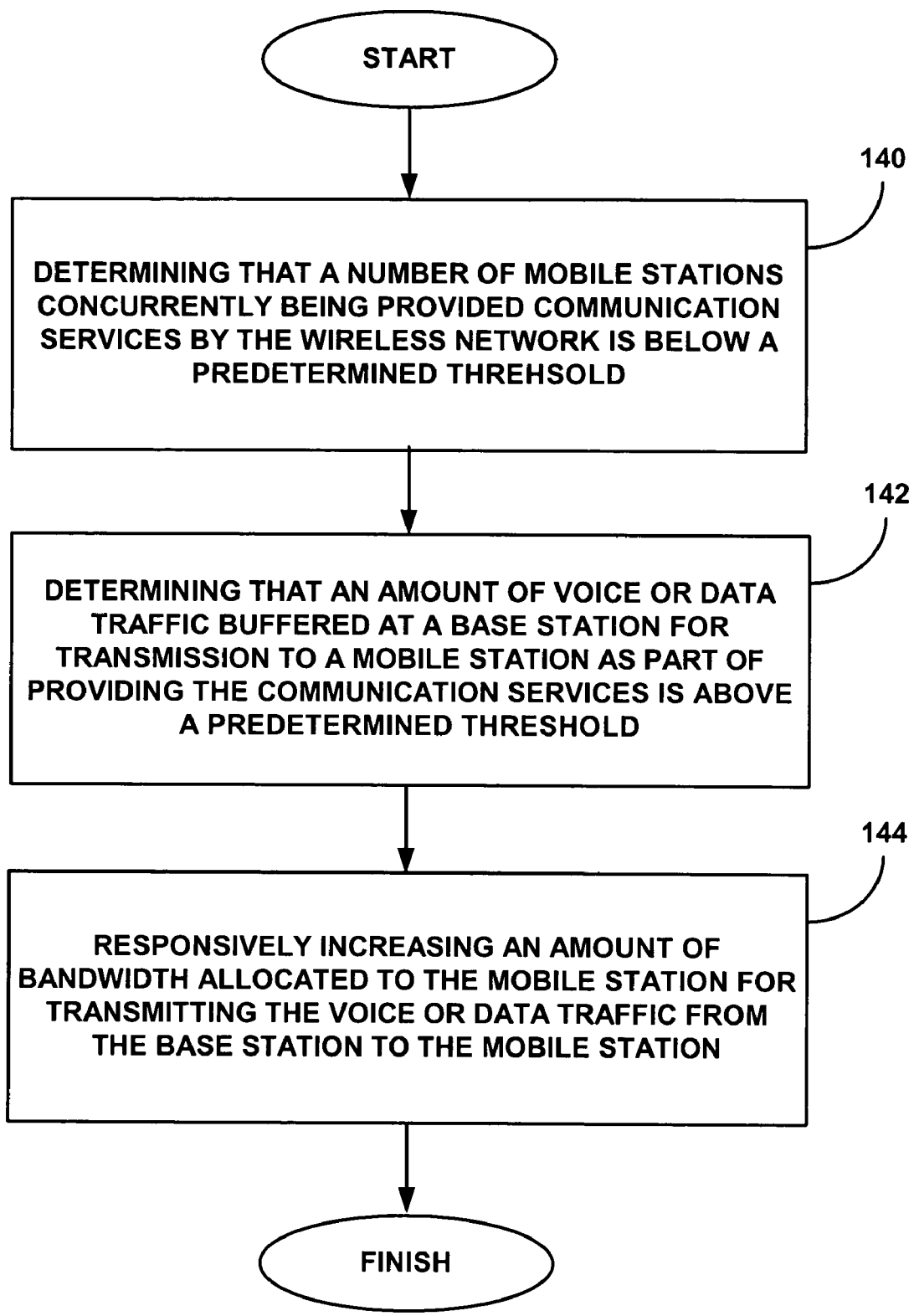
FIG. 4 is a flowchart of an exemplary process for allocating bandwidth among mobile stations in a wireless network based on the amount of data traffic that is buffered at an access point for transmission to the mobile stations.

FIG. 4 is a flowchart of an exemplary process for allocating bandwidth among mobile stations in a wireless network based on the amount of voice or data traffic that is buffered at an access point for transmission to the mobile stations. An element, such as a base transceiver station, determines that a number of mobile stations concurrently being provided communication services by the wireless network is below a predetermined threshold, as show at Step 140. The element then determines that an amount of voice or data traffic buffered at the element for transmission to a mobile station as part of providing the data services is above a predetermined threshold, as shown at Step 142. The element then responsively increases an amount of bandwidth allocated to the mobile station for transmitting the voice or data traffic from the element to the mobile station, as shown at Step 144.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a wireless communication system in which a base station uses a radio frequency bandwidth to send voice or data traffic to active mobile stations in a coverage area served by the base station, a method comprising:

dynamically allocating the radio frequency bandwidth among a first group of active mobile stations in the coverage area according to a first bandwidth allocation algorithm;

dynamically allocating the radio frequency bandwidth among a second group of active mobile stations in the coverage area according to a second bandwidth allocation algorithm;

determining that the first group of active mobile stations has met a first threshold number of active mobile stations and responsively changing the first bandwidth allocation algorithm, so as to change how the radio frequency bandwidth is dynamically allocated among the first group of active mobile stations; and determining that the second group of active mobile stations has met a second threshold number of active mobile stations and responsively changing the second bandwidth allocation algorithm, so as to change how the radio frequency bandwidth is dynamically allocated among the second group of active mobile stations.

2. A computer readable medium having stored therein instructions for causing a processor to execute the method of claim 1.

3. The method of claim 1, wherein responsively changing the first or second bandwidth allocation algorithm comprises switching to a maximum-aggregate-traffic algorithm.

4. The method of claim 1, wherein responsively changing the first or second bandwidth allocation algorithm comprises switching to a common-data-throughput algorithm.

5. The method of claim 1, wherein responsively changing the first or second bandwidth allocation algorithm comprises switching to a common-power algorithm.

6. The method of claim 1, further comprising:

using a predictive model to predict that a current number of active mobile stations that are concurrently operating in the coverage area.

7. The method of claim 1, wherein the wireless communication system is a CDMA network, and wherein the mobile station is a mobile phone.

8. The method of claim 1, further comprising:

tracking the active mobile stations in the coverage area to determine a current number of active mobile stations in the coverage area.

9. In a CDMA network in which a base station uses a forward supplemental channel to send voice or data traffic to active mobile stations being served by the base station, a method comprising:

determining that a number of active mobile stations in a first group of the active mobile stations being served by the base station has met a first threshold and responsively changing a first bandwidth allocation algorithm for the first group, wherein the first bandwidth allocation algorithm is used to allocate the forward supplemental channel among the first group of active mobile stations; and determining that a number of active mobile stations in a second group of the active mobile stations being served by the base station has met a second threshold and responsively changing a second bandwidth allocation algorithm for the second group, wherein the second bandwidth allocation algorithm is used to allocate the forward supplemental channel among the second group of active mobile stations.

10. A computer readable medium having stored therein instructions for causing a processor to execute the method of claim 9.

11. The method of claim 9, wherein responsively changing the first or second bandwidth allocation algorithm comprises switching to a maximum-aggregate-traffic algorithm.

12. The method of claim 9, wherein responsively changing the first or second bandwidth allocation algorithm comprises switching to a common-data-throughput algorithm.

13. The method of claim 9, wherein responsively changing the first or second bandwidth allocation algorithm comprises switching to a common-power algorithm.

14. The method of claim 9, further comprising:
using a predictive model to predict that a current number of mobile stations are concurrently operating in a given coverage area of the base station.

15. The method of claim 9, further comprising:
tracking the number of active mobile stations in the first group and the number of active mobile stations in the second group.

16. A wireless communication system comprising:
a base station, having an antenna arrangement for communicating over an air interface with a plurality of mobile stations in a given coverage area, wherein the base station dynamically allocates bandwidth to a first group of the mobile stations according to a first bandwidth allocation algorithm and dynamically allocates bandwidth to a second group of the mobile stations according to a second bandwidth allocation algorithm; and
program logic, stored in data storage and executable on a processor, (i) to determine that the first group has a first number of active mobile stations and to change the first bandwidth allocation algorithm based on the first number, so as to change how the system dynamically allocates the radio frequency bandwidth among the active mobile stations in the first group and (ii) to determine that the second group has a second number of active mobile stations and to change the second bandwidth allocation algorithm based on the second number, so as to change how the system dynamically allocates the radio frequency bandwidth among the active mobile stations in the second group.

17. The system of claim 16, wherein the program logic further includes logic to change the first or second bandwidth allocation algorithm to a bandwidth allocation algorithm that substantially maximizes an aggregate data traffic throughput between the base station and the mobile stations.

18. The system of claim 16, wherein the program logic further includes logic to change the first or second bandwidth allocation algorithm to a bandwidth allocation algorithm that provides approximately equal data traffic throughput rates between the base station and the respective mobile stations.

19. The system of claim 16, wherein the program logic further includes logic to change the first or second bandwidth allocation algorithm to a bandwidth allocation algorithm in which the base station uses approximately equal power levels for transmitting data traffic to the respective mobile stations.

20. The system of claim 16, wherein the base station uses CDMA to communicate with the mobile stations, and wherein the mobile stations are mobile phones.

\* \* \* \* \*